(12) United States Patent
Chilcoat

(10) Patent No.: US 10,907,645 B2
(45) Date of Patent: Feb. 2, 2021

(54) STEPPED SLINGER

(71) Applicant: Aerojet Rocketdyne, Inc., Sacramento, CA (US)

(72) Inventor: Thaddeus Chilcoat, Moorpark, CA (US)

(73) Assignee: AEROJET ROCKETDYNE, INC., Canoga Park, CA (US)

( * ) Notice: Subject to any disclaimer, the term of this patent is extended or adjusted under 35 U.S.C. 154(b) by 0 days.

(21) Appl. No.: 16/093,851

(22) PCT Filed: Jul. 26, 2017

(86) PCT No.: PCT/US2017/043866
§ 371 (c)(1),
(2) Date: Oct. 15, 2018

(87) PCT Pub. No.: WO2018/022703
PCT Pub. Date: Feb. 1, 2018

(65) Prior Publication Data
US 2019/0107116 A1    Apr. 11, 2019

Related U.S. Application Data

(60) Provisional application No. 62/367,446, filed on Jul. 27, 2016.

(51) Int. Cl.
*F04D 29/10* (2006.01)
*F02K 9/46* (2006.01)
(Continued)

(52) U.S. Cl.
CPC .............. *F04D 29/106* (2013.01); *F02K 9/46* (2013.01); *F04D 13/04* (2013.01); *F04D 13/06* (2013.01); *F04D 13/12* (2013.01); *F16J 15/164* (2013.01)

(58) Field of Classification Search
None
See application file for complete search history.

(56) References Cited

U.S. PATENT DOCUMENTS 4,990,055 A * 2/1991 Korenblit .............. F04D 29/108
                                                        415/144
8,864,441 B1 * 10/2014 Pinera ....................... F04D 1/06
                                                        415/105
(Continued)

FOREIGN PATENT DOCUMENTS

DE       202004007506          9/2005
WO    WO-2016024518 A1 *    2/2016     ............... F16J 15/44

OTHER PUBLICATIONS

International Preliminary Report on Patentability for International Application No. PCT/US2017/043866 completed Feb. 7, 2019.
(Continued)

*Primary Examiner* — Juan G Flores
(74) *Attorney, Agent, or Firm* — Joel G. Landau

(57) ABSTRACT

A turbopump includes a slinger that has a first section and a second section. The first and second sections are disposed substantially radially in a fluid circuit. The second section is downstream of, and radially inward of, the first section. A housing is located downstream and adjacent to the first section of the slinger and radially outward of the second section of the slinger.

4 Claims, 1 Drawing Sheet

(51) Int. Cl.
  *F04D 13/12*   (2006.01)
  *F04D 13/04*   (2006.01)
  *F16J 15/16*   (2006.01)
  *F04D 13/06*   (2006.01)

(56) References Cited

U.S. PATENT DOCUMENTS

2016/0177963 A1    6/2016  Danguy
2017/0081971 A1*  3/2017  Mihara .................. F16J 15/44

OTHER PUBLICATIONS

International Search Report for International Patent Application No. PCT/US2017/043866 completed Oct. 19, 2017.

* cited by examiner

STEPPED SLINGER

CROSS-REFERENCE TO RELATED APPLICATION

The present disclosure claims priority to U.S. Provisional Patent Application No. 62/367,446, filed Jul. 27, 2016.

STATEMENT REGARDING FEDERALLY SPONSORED RESEARCH OR DEVELOPMENT

This invention was made with government support under contract number FA8811-16-9-0003 awarded by the United States Air Force. The government has certain rights in the invention.

BACKGROUND

Turbopumps such as those used in liquid propellant rocket engines may be used to pressurize one or more propellants. In order to limit leakage, and thus reduce the mass of fluid that needs to be carried on a vehicle, the turbopump may include a high pressure vapor seal. Such a seal uses rotational energy of the pump to generate a high pressure vapor that serves as a barrier to leakage.

SUMMARY

A turbopump according to an example of the present disclosure includes a slinger that has a first section and a second section. The first section is disposed substantially radially in a fluid circuit and the second section is disposed substantially radially in the fluid circuit downstream of, and radially inward of, the first section. A housing is located downstream and adjacent to the first section of the slinger and radially outwards of the second section of the slinger.

In a further embodiment of any of the foregoing embodiments, the first section includes first paddles.

In a further embodiment of any of the foregoing embodiments, the second section includes second paddles.

In a further embodiment of any of the foregoing embodiments, a substantially axial section directly connects the first section and the second section to form a slinger step.

In a further embodiment of any of the foregoing embodiments, the housing includes a housing step that nests with the slinger step.

In a further embodiment of any of the foregoing embodiments, the slinger is on a rotatable shaft.

In a further embodiment of any of the foregoing embodiments, the slinger is located between first and second fluid sections that are configured to handle different fluids.

In a further embodiment of any of the foregoing embodiments, the first section defines a first radial height and the second section defines a second radial height that is less than the first radial height.

A turbopump according to an example of the present disclosure includes first and second pump sections configured to pump different fluids, and a seal system between the first and second pump sections. The seal system has a rotatable disk having a first axially-facing side, a radially-facing side, and a second axially-facing side that together form a step. A housing is adjacent the rotatable disk. The housing and rotatable disk define a fluid passage there between. The axially-facing side of the rotatable disk includes first paddles that extend partially across the fluid passage toward the housing, and the second axially-facing side is radially inwards of the housing In a further embodiment of any of the foregoing embodiments, the first axially-facing side defines a first radial height and the second axially-facing side defines a second radial height that is less than the first radial height.

In a further embodiment of any of the foregoing embodiments, the radially-facing side defines an axial length that is intermediate the first radial height and the second radial height.

In a further embodiment of any of the foregoing embodiments, the fluid passage has an upstream end adjacent a radially outer end of the first axially-facing side and a downstream end adjacent a radially inner end of the second axially-facing side, and further includes a seal element disposed at the downstream end.

In a further embodiment of any of the foregoing embodiments, the second axially-facing side includes second paddles.

In a further embodiment of any of the foregoing embodiments, the second axially-facing side is radially inwards of the first axially-facing side.

In a further embodiment of any of the foregoing embodiments, the first pump section is an oxidizer pump and the second pump section is a fuel pump.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
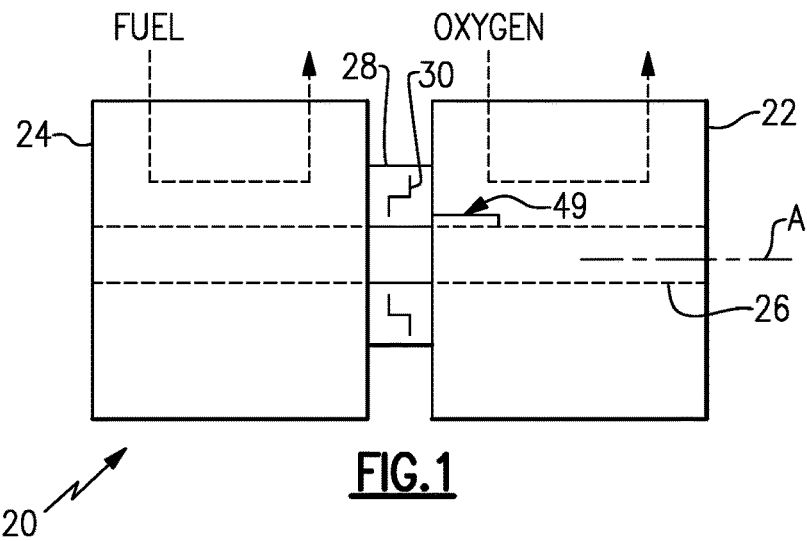
FIG. 1 illustrates an example turbopump.

FIG. 1 schematically illustrates a turbopump 20. The turbopump 20 may be used in a liquid propellant rocket motor, but it is to be appreciated that the examples herein will also benefit other types of pumps. The turbopump 20 in the illustrated example generally includes a first pump section 22 and a second pump section 24 that are configured to pump different fluids. For instance, the turbopump 20 is used in a liquid propellant rocket engine to pump liquid oxygen and fuel propellants. In this regard, the first pump section 22 may be fluidly connected with a liquid oxygen tank as an oxygen pump and the second pump section 24 may be fluidly connected with a fuel tank as a fuel pump. The pump sections 22/24 are generally mounted on a drive shaft 26. Each pump section 22/24 may include pump blades and vanes for pressurizing the fluids conveyed there through.

Figure 2:
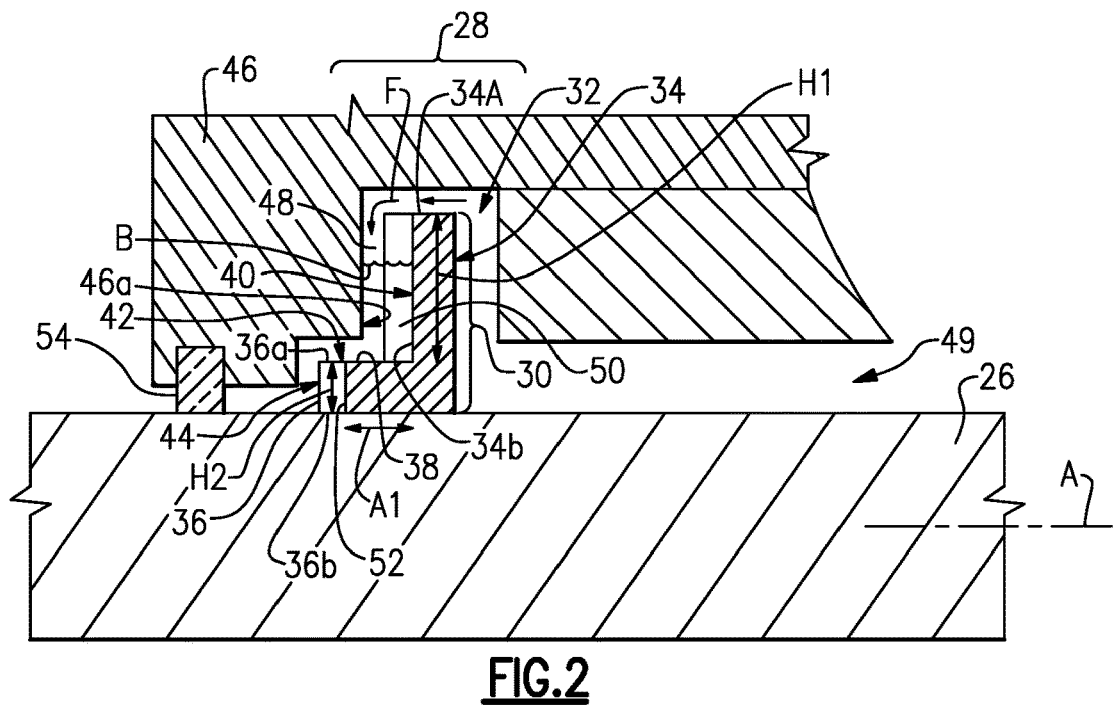
FIG. 2 illustrates a seal system of the turbopump.

The turbopump 20 includes a seal system 28, also shown in FIG. 2, located between the pump sections 22/24. The seal system 28 serves to reduce leakage between the pump sections 22/24 due to the differential pressures of the fluid in the sections. Although depicted in this disclosure in the turbopump 20, the seal system 28 may also benefit other types of pumps and pump configurations such as, but not limited to, a seal between a pump and a turbine, a seal between a pump and an electric motor, a seal between a pump and atmosphere, or a seal between internal pump components.

As shown in the enlarged view in FIG. 2, the seal system 28 includes a stepped slinger 30 that facilitates forming a vapor barrier, represented at B, during operation of the turbopump 20. A slinger 30 is a rotating disk with paddles 50 attached to or integral with the disk, wherein the paddles 50 are radially oriented and disposed circumferentially. The disk is typically mounted to a shaft, such as shaft 26, to impart rotation of the paddles 50. When rotating, the paddles 50 create a radial pressure differential increasing with radial distance from the rotational axis A. The vapor barrier B facilitates limiting leakage of fluid through a fluid circuit 32 in the seal system 28.

The stepped slinger 30 includes a first section 34 and a second section 36. Both the first and second sections 34/36 are disposed substantially radially in the fluid circuit 32. The second section 36 is downstream of, and radially inward of, the first section 34. The first section 34 includes a radially outer end 34a and a radially inner end 34b. Similarly, the second section 36 includes a radially outer end 36a and a radially inner end 36b.

The stepped slinger 30 further includes a substantially axial section 38 that directly connects the radially inner end 34b of the first section 34 to the radially outer end 36a of the second section 36. As used herein, the terms "radially," "axially," or variations thereof refer to orientations relative to a rotational axis A of the pump sections 22/24. A "radially" oriented section is elongated in a direction that is perpendicular to the axis A, and an "axially" oriented section is elongated in a direction that is parallel to the axis A. As will be appreciated by those of skill in the art given this disclosure, the orthogonal radial and axial directions are nominal and may vary somewhat in accordance with accepted manufacturing tolerances. The term "substantially" refers to the orientations, within the manufacturing tolerances, or at least within +/−3° of radial or axial directions.

The first section 34, the second section 36, and the axial section 38 together form a rotatable disk on the shaft 26. The first section 34 has a first axially-facing side 40, the axial section 38 has a radially-facing side 42, and the second section 36 includes a second axially-facing side 44. The sides 40/42/44 form the step of the stepped slinger 30.

A housing 46 is located adjacent the rotatable disk. The housing 46 defines a corresponding step 46a that nests with the step of the stepped slinger 30 such that the surfaces of the step 46a of the housing 46 fit closely with the sides 40/42/44 of the stepped slinger 30. The close fit between the housing 46 and the stepped slinger 30 defines a fluid passage 48 in the fluid circuit 32. The housing 46 is generally located downstream and adjacent to the first section 34 of the stepped slinger 30 and radially outwards of the second section 36 of the stepped slinger.

Figure 3:
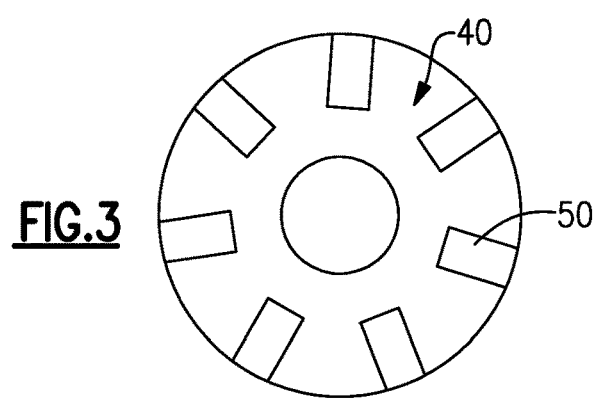
FIG. 3 illustrates paddles on a stepped slinger of the seal system.

The first axially-facing side 40 includes first paddles 50 that extend partially across the fluid passage 48 toward the housing 46. The paddles 50 are also shown in an isolated, axial view of the disk in FIG. 3. In this example, the paddles 50 are circumferentially spaced around the first axially-facing side 40. Similarly, in this example, the second axially-facing side 44 includes second paddles 52 that extend into the fluid passage 48.

During operation of the turbopump 20, a high pressure fluid, such as fluid F, flows into the fluid circuit 32 and fluid passage 48. In this example, the fluid F flows from a hydrostatic bearing 49 adjacent the seal system 28. As will be appreciated given this disclosure, the source of the fluid F is not limited to the hydrostatic bearing 49 and will depend on the particular design of the implementation of the seal system 28.

The stepped slinger 30 facilitates forming the vapor barrier B from the fluid F. The fluid F flows into the fluid passage 48 at an upstream end located at the radially outer end 34a of the first section 34. Because the liquid at the slinger tip is at a higher pressure a boundary layer can develop down the non-rotating housing 46 face across the gap from the rotating slinger 30. This high density liquid boundary layer along the housing 46 will bypass the slinger 30 and increase the leakage mass flow. The portion of the fluid F that flows between the first paddles 50 is vaporized and forms a vapor seal. The first paddles 50, which rotate with the shaft 26, serve to mix and pump fluid F radial outward, thereby increasing the fluid enthalpy and decreasing the fluid pressure below the vapor pressure. The energy that the rotating paddles 50 impart into the fluid F serves to vaporize at least a portion of the non-rotating boundary layer. Any remaining boundary layer flow may continue to flow through the fluid passage 48 radially inward along the housing 46 and across section 38 to the second section 36. In the second section 36, the second paddles 52 disrupt the boundary layer and vaporize at least a portion of the remaining liquid. Depending on the rotational energy and amount of vaporization from the first paddles 50, the second section 36 may not have the second paddles 52 if vaporization from the first paddles 50 is acceptable.

The size of the stepped slinger 30 may facilitate energizing and vaporizing the fluid F. For instance, the first section 34 (and also the first axially-facing side 40) has a radial height H1 and the second section 36 (and also the second axially-facing side 44) has a second radial height H2 that is less than the radial height H1. In this example, the horizontal section 38 (and also the radially-facing side 42) defines an axial length A1 that is intermediate H1 and H2. The size of the first radial height H1 is sufficient to vaporize most of the fluid F. The radial height H2 of the second section 36 need not be as large in order to vaporize remaining liquid that is not vaporized by the first section 34. The high pressure vapor that is created serves to limit leakage of the condensate through the fluid circuit 32. In this example, a seal element 54 is provided in a downstream end of the fluid passage 48 near the radially inner end 36b of the second section 36 to facilitate blocking escape of fluid F and high pressure vapor to a drain on the opposed side of the seal element 54. The stepped slinger 30 disrupts the boundary layer flow down the non-rotating face and forces the liquid into the rotating fluid flow facilitating more complete vaporization the fluid F in comparison to a straight non-stepped slinger.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosure examples may become apparent to those skilled in the art that do not necessarily depart from this disclosure. The scope of legal protection given to this disclosure can only be determined by studying the following claims.

What is claimed is:

1. A turbopump comprising:
  a slinger having a first section and a second section, the first section being disposed substantially radially in a fluid circuit and the second section being disposed substantially radially in the fluid circuit downstream of, and radially inward of, the first section, wherein the first section includes first paddles and the second section includes second paddles, wherein a substantially axial section directly connects the first section and the second section to form a slinger step; and a housing located downstream and adjacent to the first section of the slinger and radially outwards of the second section of the slinger, wherein the housing includes a housing step that nests with the slinger step, wherein a surface of the housing step fits closely with a radially-facing side of the substantially axial section.

2. The turbopump as recited in claim 1, wherein the slinger is on a rotatable shaft.

3. The turbopump as recited in claim 1, wherein the slinger is located between first and second fluid sections that are configured to handle different fluids.

4. The turbopump as recited in claim 1, wherein the first section defines a first radial height and the second section defines a second radial height that is less than the first radial height.

\* \* \* \* \*